A. J. FAIRBANKS.
ADVERTISING APPARATUS.
APPLICATION FILED AUG. 12, 1914.
1,189,676.
Patented July 4, 1916.
2 SHEETS—SHEET 1.
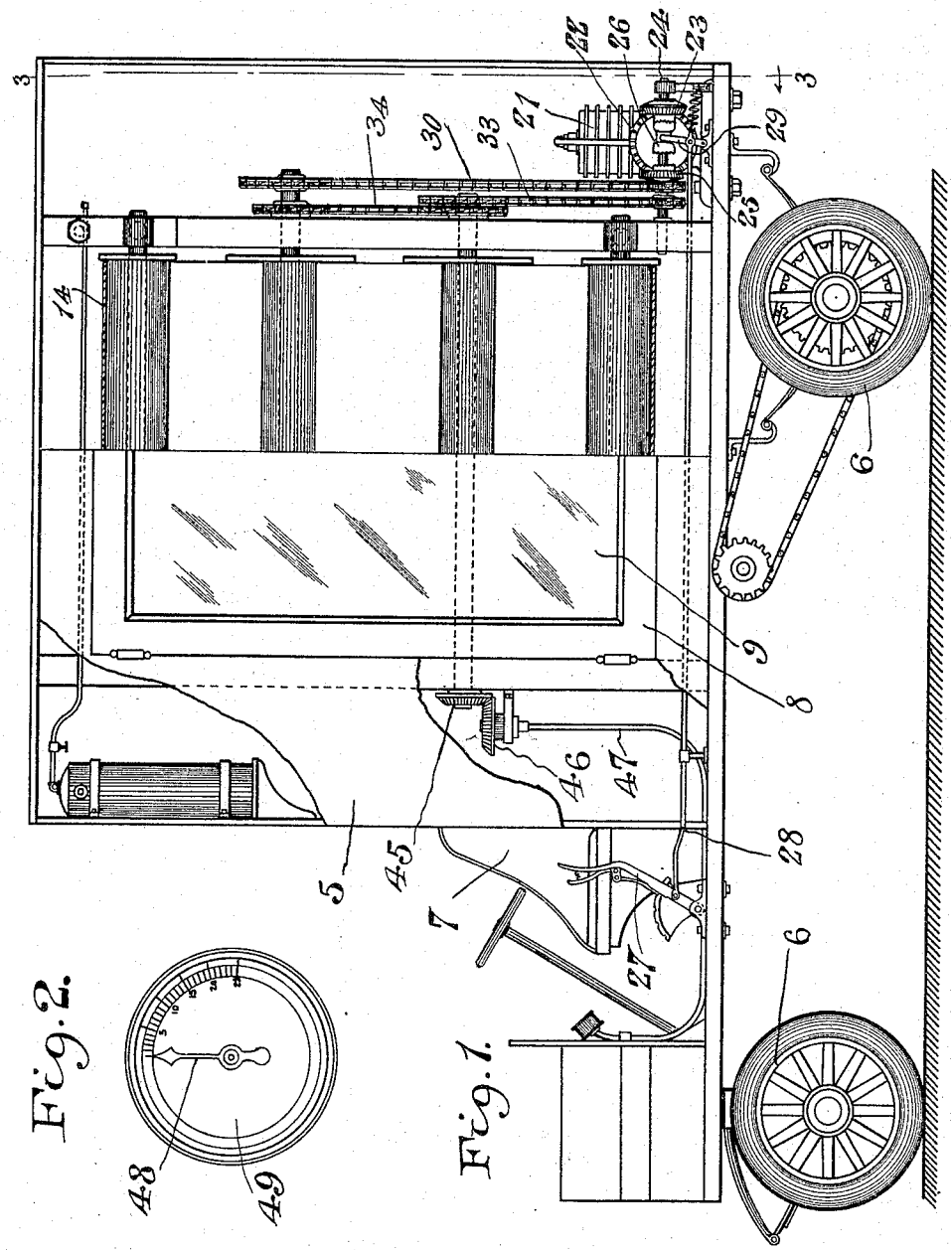
WITNESSES:
Osborne Smedstad
E. B. Walley
INVENTOR.
A. J. Fairbanks.
by
ATTORNEYS.

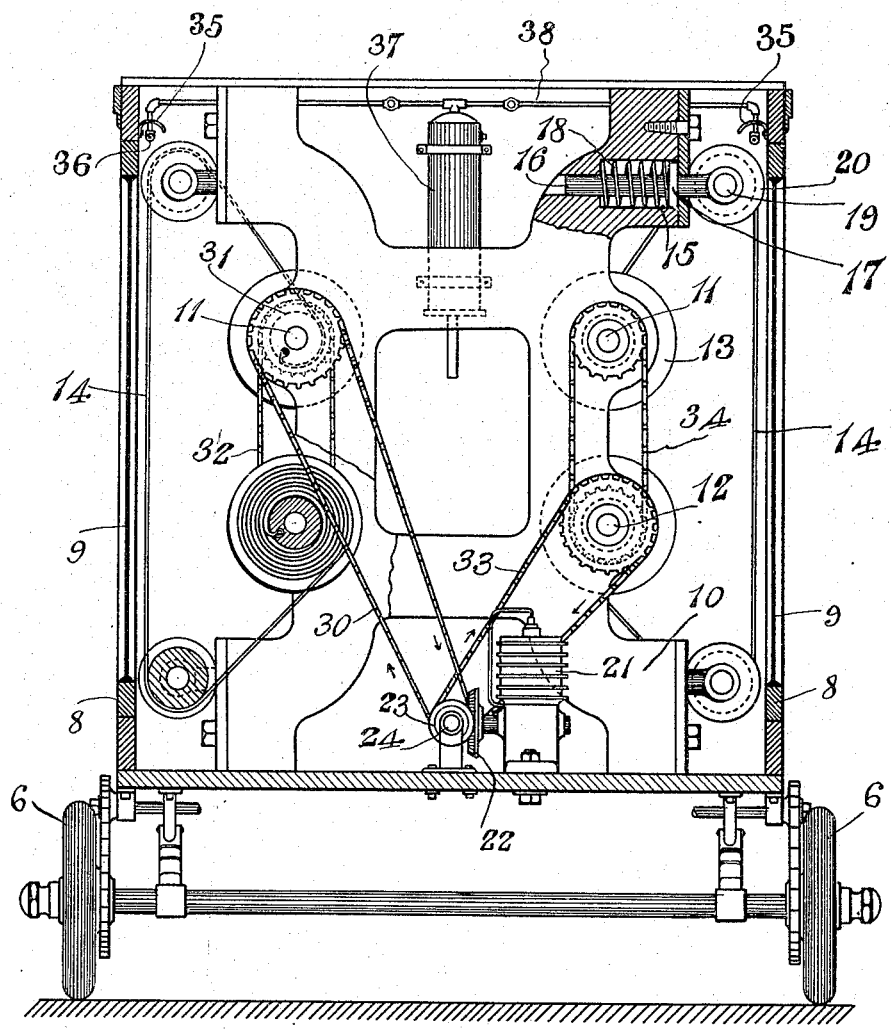

UNITED STATES PATENT OFFICE.

ALFRED J. FAIRBANKS, OF SAN FRANCISCO, CALIFORNIA.

ADVERTISING APPARATUS.

1,189,676.  Specification of Letters Patent.  Patented July 4, 1916.

Application filed August 12, 1914. Serial No. 856,461.

*To all whom it may concern:*

Be it known that I, ALFRED J. FAIRBANKS, a citizen of the United States, residing at San Francisco, in the county of San Francisco and State of California, have invented certain new and useful Improvements in Advertising Apparatus; and I do hereby declare the following to be a full, clear, and exact description of the invention, such as will enable others skilled in the art to which it appertains to make and use the same.

This invention relates to an advertising apparatus especially designed for attachment to a motor vehicle whereby the apparatus may be quickly and conveniently conveyed from place to place.

An object of the invention is the provision of an advertising apparatus including a vehicle having transparent side walls through which are visible a plurality of traveling advertising or other signs.

Another object is the provision of means for reliably and detachably securing a plurality of signs or the like in a strip whereby the same may be caused to travel in succession behind the transparent sides of the vehicle.

Another object is the provision of means for illuminating the signs or exhibitors so as to render the same clearly visible at night.

With these and other objects in view, the invention consists in the novel construction, arrangement and the formation of parts as will be hereinafter specifically described, claimed and illustrated in the accompanying drawings, in which, Figure 1 represents a side elevation, partly broken away, of a vehicle equipped with the improved advertising apparatus, Fig. 2 represents a front elevation of the indicating device, Fig. 3 represents a vertical sectional view on the line 3—3 of Fig. 1 looking in the direction of the arrow.

Referring to the drawings in detail, wherein similar reference numerals designate corresponding parts throughout the several views, the numeral 5 indicates the body of a motor vehicle supported upon wheels 6 and provided with a driver's seat 7. The sides of the body 5 are provided with openings providing doorways in which are hinged doors 8 having sections of transparent material 9 therein, whereby the advertising devices, which will be hereinafter described, are visible from the outside of the vehicle. A pair of supports 10 are secured transversely within the body 5 in spaced relation and are provided with bearings rotatably receiving shafts 11 and 12. Each of the shafts 11 and 12 is provided with a pair of spaced flanges 13 thus providing winding drums for the strips indicated generally by the numeral 14 and preferably formed of a plurality of removable and interchangeable sections on which the desired advertising or other matter is printed or otherwise marked. The upper portions of the supports 10 are apertured as indicated at 15 to receive the shanks 16 of eyebolts having flanges 17. Springs 18 are mounted in the apertures 15, in enlargements formed therein, to engage the flange 17 for normally retaining the shanks 16 in extended position. Idlers 19 are rotatably mounted in the outer apertured ends of the eyebolts 16 and are provided with flanges 20 for guiding the strips 14 in position behind the transparent sections 9 in the doors. The spring actuated eye bolts and idlers 16 and 19, respectively, normally retain the sectional indicator strip 14 in outwardly extended position and may, when necessary be moved inwardly against the tension of the springs 18 to provide sufficient slack in the indicator strip to facilitate removal or interchanging of the sections thereof.

A gas or electric engine 21 is suitably supported upon the floor of the body 5 of the vehicle rearwardly of the supports 10 and the main shaft thereof is provided with a beveled gear wheel 22 meshing with the gear wheel 23 on the intermediate shaft 24. A second beveled gear wheel 25 is positioned on the shaft 24 and meshes with the beveled gear wheel 22 at a point diametrically opposite the point of mesh of the wheel 23. Both the wheels 23 and 25 are rotatably mounted on the supports and are adapted to be locked for rotation by a clutch member 26 slidable longitudinally of the shaft intermediate the wheels 23 and 25 and non-rotatable thereon. A hand lever 27 is pivotally supported near the driver's seat 7 and is connected with the clutch member 26 by a connecting rod 28 and lever 29. A sprocket-wheel is keyed on the shaft 24 forwardly of the wheel 25 and a drive-chain 30 extends over said sprocket wheel and a wheel 31 is keyed on the upper shaft 11 outwardly of the supports 10 for driving said shaft. The shaft 11 is operatively connected with the shaft 12 by a chain 32 extending over sprocket wheels secured on the forward ends of the shafts. The other pair of shafts 11 and 12 are driven from the shaft 24 through the chains 33 and 34.

Reflectors 35 are arranged above each of the doors 8 in the sides of the vehicle and illuminating burners 36 are arranged thereunder. The burners 36 are supplied with gaseous fuel from a tank 37 suitably secured in the body of the vehicle and connected with the burners by pipes 38.

Another gear wheel 45 is secured to one of the shafts 12 and meshes with a gear wheel 46 connected with a flexible shaft 47 operably connected at its opposite extremity with an indicator 48 movable over a dial 49. The markings of the dial 49 and the indicator 48 are so spaced with relation to the shafts 11 and 12 that the driver of the vehicle may ascertain at a glance the number of the section 40 passing behind the transparent section 9.

While I have herewith shown my invention as applied to use on a motor driven vehicle, it will be clearly understood that the same may be applied to any other type of vehicle, as desired.

What I claim is:—

In combination, a housing, a transparent section positioned in the side of said housing, a pair of supports secured in said housing having apertures therein, shafts rotatably mounted in said supports, a strip secured at its opposite ends to said shafts, eye bolts slidably mounted in said apertures, flanges on the shanks of said eye bolts for limiting the outward movement thereof, spring means normally retaining said eye bolts in outwardly extended position, and a pair of guide rollers supported one above the other in the eye bolts supporting said strip in position adjacent said transparent section.

In testimony whereof I affix my signature in presence of two witnesses.

ALFRED J. FAIRBANKS.

Witnesses:
DANIEL J. WATSON,
SID. S. PALMER.